US010565993B2

(12) United States Patent
Hebert et al.

(10) Patent No.: US 10,565,993 B2
(45) Date of Patent: Feb. 18, 2020

(54) ENHANCING GROUP DECISIONS WITHIN SOCIAL MESSAGING APPLICATIONS

(71) Applicant: Disney Enterprises, Inc., Burbank, CA (US)

(72) Inventors: Jennifer Hebert, Santa Monica, CA (US); Anthony Mutalipassi, Los Angeles, CA (US); Nicholas Lewerke, Los Angeles, CA (US); Levon Karayan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1006 days.

(21) Appl. No.: 14/611,109

(22) Filed: Jan. 30, 2015

(65) Prior Publication Data

US 2016/0224673 A1    Aug. 4, 2016

(51) Int. Cl.
*G10L 13/00* (2006.01)
*G10L 15/26* (2006.01)
*H04L 12/58* (2006.01)
*H04L 29/06* (2006.01)
*G06Q 30/06* (2012.01)

(52) U.S. Cl.
CPC ............... *G10L 15/26* (2013.01); *G06Q 30/06* (2013.01); *H04L 51/16* (2013.01); *H04L 51/32* (2013.01); *H04L 65/403* (2013.01)

(58) Field of Classification Search
None
See application file for complete search history.

(56) References Cited

U.S. PATENT DOCUMENTS

| 7,734,641 | B2 | 6/2010 | Kanigsberg et al. |
| 7,743,067 | B2 | 6/2010 | Ducheneaut et al. |
| 8,099,079 | B2 | 1/2012 | Myllynen et al. |
| 8,190,999 | B2 | 5/2012 | Chen et al. |
| 8,381,249 | B2 | 2/2013 | Rasanen et al. |
| 8,838,079 | B2 | 9/2014 | Whers et al. |

(Continued)

FOREIGN PATENT DOCUMENTS

WO    2013192507 A2    12/2013

OTHER PUBLICATIONS

Wu et al., A Context-Aware Recommender System Based on Social Media, Int'l Conference on Computer Science, Data Mining & Mechanical Engg. (ICCDMME'2015), Bangkok (Thailand), Apr. 20-21, 2015, pp. 1-5.

(Continued)

*Primary Examiner* — Tonya Joseph
(74) *Attorney, Agent, or Firm* — Sheppard Mullin Richter & Hampton LLP

(57) ABSTRACT

A system and method of enhancing group decision-making within messaging platforms, the method comprising analyzing a conversation thread between two or more participants communicating using a messaging platform; identifying one or more keywords occurring in the conversation thread associated with an event characteristic; determining a contextual use of the one or more keywords; determining one or more events relevant to the identified event characteristic and the contextual use; locating and retrieving event-related information for the one or more events from a decision support system; and presenting the retrieved event-related information to the two or more participants.

20 Claims, 5 Drawing Sheets

(56) References Cited

U.S. PATENT DOCUMENTS

| | | |
|---|---|---|
| 9,021,034 B2 | 4/2015 | Narayanan et al. |
| 9,135,363 B2 | 9/2015 | Chow |
| 2006/0129455 A1 | 6/2006 | Shah |
| 2006/0230015 A1* | 10/2006 | Gupta .................. G06F 16/951 |
| 2009/0083142 A1* | 3/2009 | Keswani ............. G06Q 10/107 |
| | | 705/14.36 |
| 2015/0095855 A1 | 4/2015 | Bai et al. |
| 2015/0248651 A1 | 9/2015 | Akutagawa et al. |

OTHER PUBLICATIONS

Shi et al., Mining Mood-specific Movie Similarity with Matrix Factorization for Context-aware Recommendation, CAMRa2010, Sep. 30, 2010, pp. 35-40, Barcelona, Spain.

Becker et al., Event Identification in Social Media, Twelfth International Workshop on the Web and Databases (WebDB 2009), Jun. 28, 2009, pp. 1-6, Providence, Rhode Island, USA.

* cited by examiner

ENHANCING GROUP DECISIONS WITHIN SOCIAL MESSAGING APPLICATIONS

TECHNICAL FIELD

The disclosed technology relates generally to group decision-making, and more particularly, to enhancing group decision-making within social messaging platforms.

DESCRIPTION OF THE RELATED ART

More and more, people are planning their social lives using their mobile devices. Messaging platforms, such as group chat applications, allow two or more people to communicate simultaneously over a communication network. Mobile communication through messaging applications and social media has become the preferred method of communicating, especially among the younger generations.

BRIEF SUMMARY OF EMBODIMENTS

Various embodiments of the disclosed technology are directed to enhancing social group decision making within a messaging platform. Such decisions may include a movie to view, a play to attend, or a musical concert to see, among others. The technology disclosed herein analyzes conversations between groups communicating using messaging platforms. In various embodiments, the technology identifies contextual references to events and activities and provides relevant information to the group. The information is presented within the messaging platform. This eliminates the inefficiency and friction injected into group decision making by providing the relevant information to the group in the location for which the group is making plans. The technology disclosed herein helps make group decision-making about social gatherings/group entertainment faster, easier, and more efficient.

In accordance with various embodiments, a system for group decision making support is provided, comprising: one or more memory components configured to store event-related information for a plurality of events; an analyzer module coupled to a messaging platform and configured to monitor a conversation between two or more users through the messaging platform over a communication network, identify one or more keywords associated with at least one of the plurality of events, and determine one or more relevant events based on the identified keywords; and a retrieval module configured to locate and retrieve event-related information for the relevant events identified by the analyzer module, and further configured to present the information to the two or more participants.

In accordance with various embodiments, a computer-implemented method is provided, comprising analyzing a conversation thread between two or more participants communicating using a messaging platform over a communications network; identifying one or more keywords associated with an event characteristic; determining one or more events relevant to the identified event characteristic; locating and retrieving event-related information for the one or more events from a decision support system; and presenting the retrieved event-related information to the two or more participants.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any technology described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
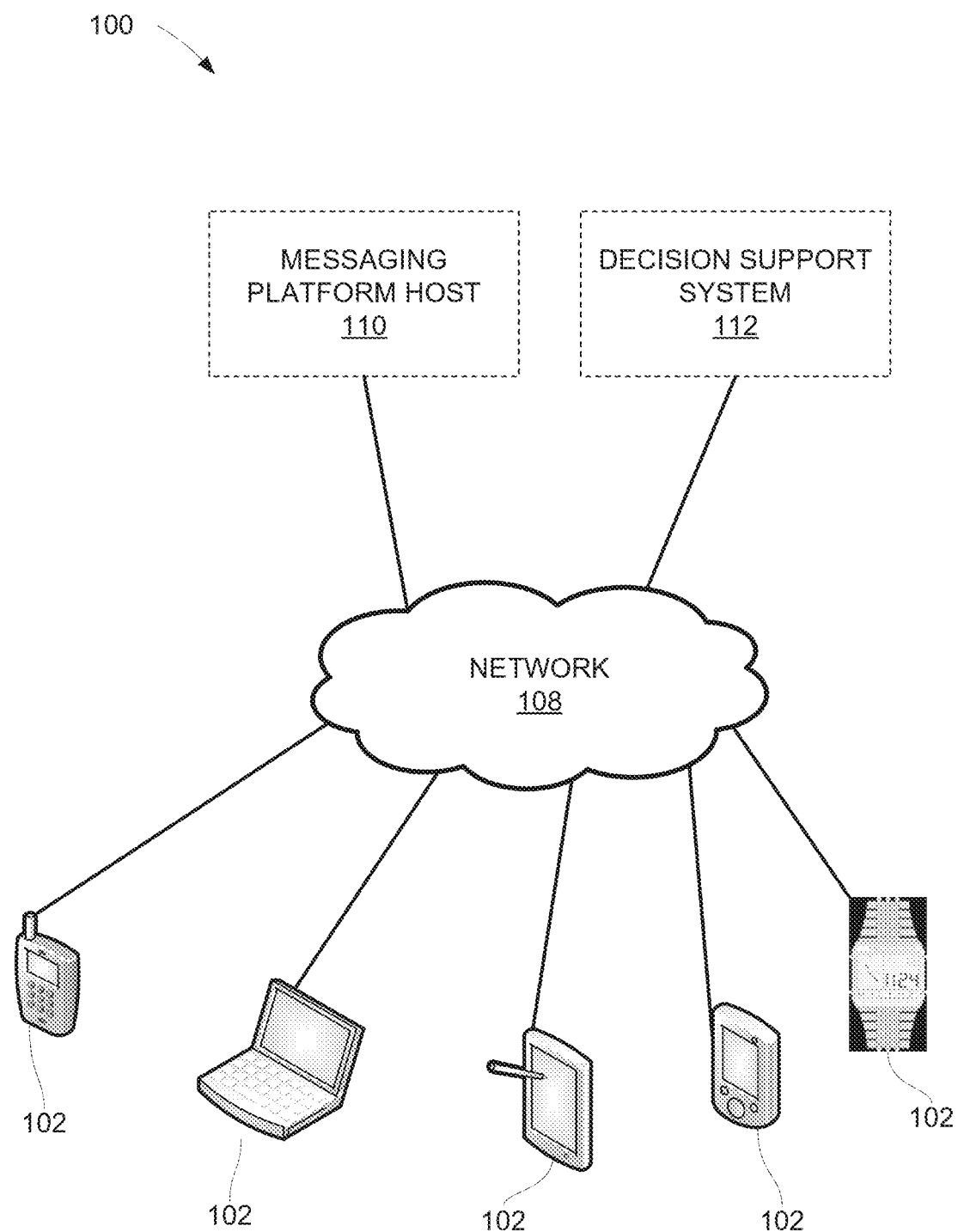
FIG. 1 illustrates an example environment in which various embodiments of the disclosed technology may be implemented.

The figures are not intended to be exhaustive or to limit the present disclosure to the precise form disclosed. It should be understood that the technology disclosed can be practiced with modification and alteration, and that the disclosed technology can be limited only by the claims and the equivalents thereof.

DETAILED DESCRIPTION OF THE EMBODIMENTS

Group decision making can often involve a great deal of collaboration between everyone involved in the group. Messaging platforms on mobile devices, such as smartphones and tablets, have eliminated some of the friction present in group decision making by allowing for almost seamless communication between the participants of a group conversation. Two or more users may communicate simultaneously from anywhere over a communication network, allowing a greater level of collaboration in making a decision on social activities.

However, information relevant to the group decision does not surface within the messaging platforms. Generally, messaging platforms merely provide the ability for two or more users to communicate, exchange videos or other types of media, and stay connected even though the two or more users may be remotely located from each other. Most messaging platforms do not have access to social event- or activity-related information that may be relevant to some subject of interest that is being discussed in a group chat or messaging session. For example, if a group of people communicating using a messaging platform were discussing seeing a movie, relevant information could include, but is not limited to the movies that may be currently playing, show times and locations in a nearby area or other area of interest, and synopses and reviews for those movies. This information is currently not available within messaging platforms. Hence, one or more participants to a messaging platform conversation must "leave" the messaging platform and search for such relevant information from other sources. This injects friction into the decision-making process because one or more participants become responsible for obtaining and providing relevant information to support the group's decision. Without this supporting information, the group may default to habitual, easily remembered or identified options that require no outside information to support the group decision.

When making decisions in a group setting, obtaining any relevant information can be difficult. Information may be scattered in different sources. To locate relevant information, one or more participants must search the different sources. This is time consuming, especially when no decision has been made on a specific event or activity. Some of the friction and inefficiency may be avoided by identifying specific events prior to searching for the information. This pre-identification, however, is either made by only a portion of the group, or is made by the group before gaining knowledge of different options. Further, information gathered by a participant may be filtered through the individuals personal preferences, limiting the information presented and failing to account for other group participant's preferences. The searching individual might fail to present such things as promotional materials or alternative options of which the individual was not aware, among other types of information.

By providing more functionality to messaging platforms, such as integrating or embedding relevant information within the platform itself, the friction associated with group decision-making may be removed. Accordingly, various embodiments described in the present disclosure provide systems and methods that enhance group decision-making within messaging platforms. More particularly, various embodiments described in the present disclosure provide relevant information related to social events and activities based on the context of a group conversation through a messaging platform.

That is, in accordance with various embodiments, participants in a group conversation need not engage in the following actions: decide on a particular event beforehand; leave the conversation to separately access relevant information; and utilize event-specific transaction environments to schedule a group social event.

Before describing the technology of the present application in detail, it is useful to describe an example environment in which the application can be implemented. FIG. 1 illustrates one such example environment. The example environment 100 comprises various user devices 102 communicating over a network 108. Each user device 102 may include a processing module and a memory configured to store program code executable by the processing module. Some non-limiting examples of user devices 102 include smartphones, tablets, PDAs, laptops, wearable computing devices (e.g., smartwatches), or any other mobile computing device capable of communicating over a communication medium with other devices.

Network 108 may be any communications network, such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 109 may employ various communication media, such as a coaxial cable, fiber optic cable system, Ethernet, radio waves, etc.

As illustrated in FIG. 1, environment 100 includes a messaging platform host 110. Messaging platform host 110 includes servers configured to provide the back-end functionality for the messaging platform. User devices 102 interact with messaging platform host 110 over network 108 through local incidents of the messaging platform operating on user devices 102. In various embodiments, user devices 102 may include a messaging platform application program downloaded onto the user device's memory, allowing the messaging platform to operate on the device. In other embodiments, a local client at user device 102 may be used, such as a web browser or a plug-in. Unlike a downloaded application, which may perform some or all of the processing necessary for the messaging platform, the local client simply sends a request to messaging platform host 110 to perform the functions necessary to enable communication through the messaging platform. In some embodiments, messaging platform host 110 may utilize a text-based capability of the user device 102, such as SMS text messaging, to allow participants to communicate without the need for a local client downloaded application.

Decision support system 112 communicates with user devices 102 and messaging platform host 110 over network 108. Decision support system 112 is configured to provide contextually relevant information related to social events and activities to participants of a group conversation occurring through the messaging platform operating at each user device 102. In various embodiments, decision support system may be an application programming interface (API), comprising a library of system calls, that is available for use by messaging platform developers to add functionality in accordance with the present disclosure to each messaging platform. In other embodiments, decision support system 112 may be a plug-in or stand-alone application that is configured to interact with messaging platforms operating at each user device 102.

Figure 2:
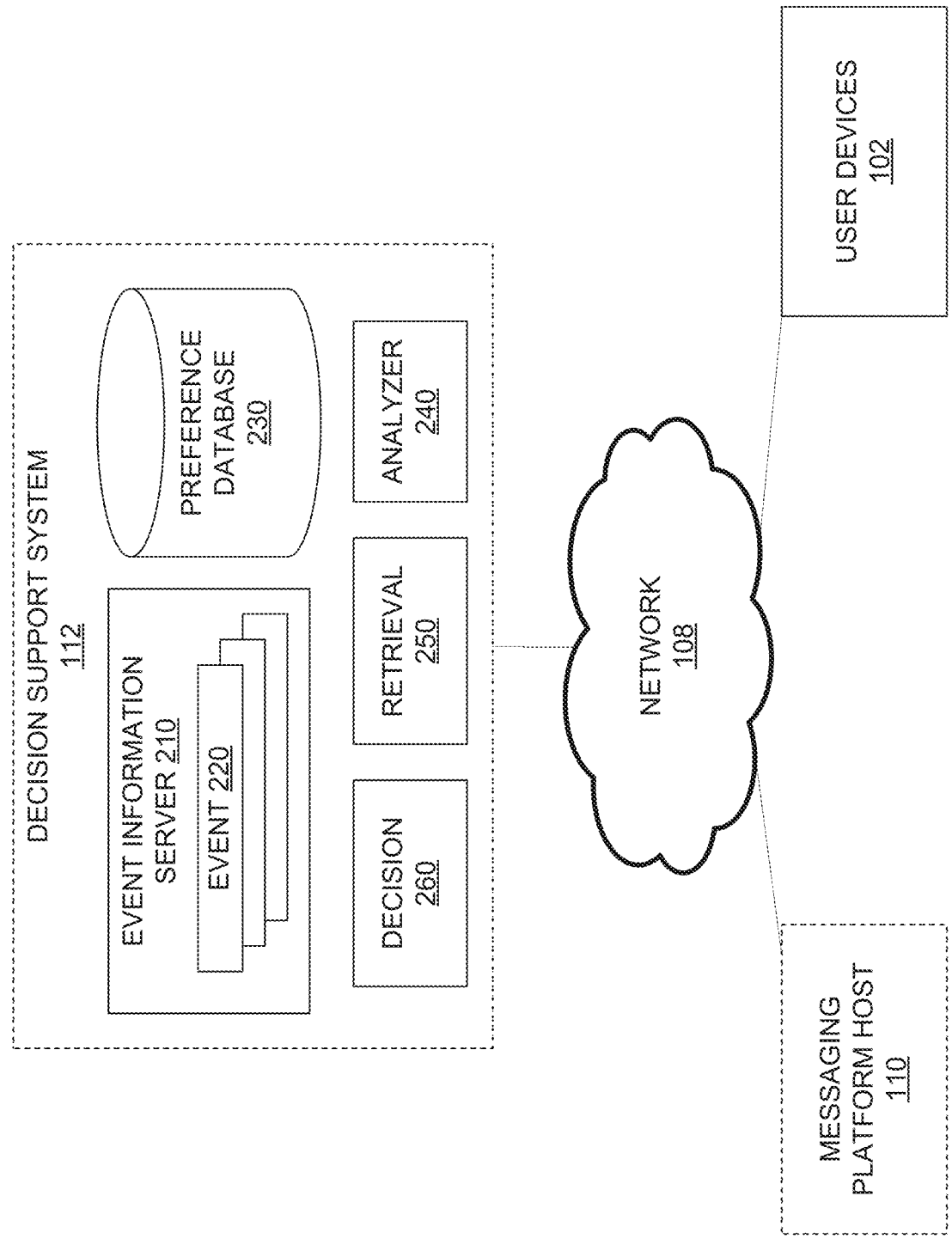
FIG. 2 illustrates an example decision support system in accordance with various embodiments of the technology disclosed herein.

The particular components of decision support system 112 are shown in FIG. 2. In various embodiments, decision support system 112 includes an analyzer module 240. Analyzer module 240 may be configured to analyze a conversation occurring between two or more participants using a messaging platform and identify social events and activities relevant to the group conversation. In determining what is a relevant event, analyzer module 240 may pull information from a variety of sources.

In various embodiments, analyzer module 240 may analyze the conversation thread and determine the context of a participant's message. For example, if the participant's message contains one or more keywords associated with an event or activity, analyzer module 240 can determine the context in which the participant is speaking. For example, if one participant uses the word "dinner," analyzer module 240 could analyze the conversation and determine whether the participant is attempting to schedule a dinner with the group, attend an event with the word "dinner" in the title (like a movie or show), or was simply discussing what they had for dinner. In this manner, analyzer module 240 can identify when a participant is using the keyword as a reference to the event or activity, or using the keyword in a more general connotation. This ensures that only information relevant to a group decision-making process is being interjected into the conversation.

In addition, analyzer module 240 may be configured to identify contextual clues indicative of a desired time and/or location for an event. For example, if a participant expresses a preference seeing a movie "now," analyzer module 240 can use that information to identify as relevant only movie show times starting within the near future. Analyzer module 240 may be configured to identify the temporal context of general terms, such as "now," "tomorrow," or "next month," among others. This ensures that only information useful to a group decision-making process is being interjected into the conversation.

The same type of analysis may be used to determine a geographical context of the message. For example, if a participant expresses a preference to attend an event while in "Nashville," analyzer module 240 can use that information to identify as relevant only events occurring in Nashville. This ensures that only information useful to a group decision-making process is being interjected into the conversation.

In various embodiments, analyzer module 240 may employ different predictive, matching, or context-identifying algorithms to determine the context of a message. For example, analyzer module 240 could employ one or more of T9, WordWise, Lesk algorithm, word-sense disambiguation algorithms for natural language processing, or other algorithms.

In various embodiments, analyzer module 240 may pull participant-related information from sources other than the current conversation to identify relevant events or activities. The participant-related information may include any type of information unique to each participant that would be helpful in determining the relevance of an event or activity. For example, participant-related information may include, but is not limited to: the types of music, movies, and/or theater genres a participant enjoys (e.g., musicals, horror movies, pop music); favorite movies, shows, plays, sports teams, or activities of the participant; or what events and activities the participant has recently attended. The participant-related information may be pulled found in various locations.

In various embodiments, analyzer module 240 may pull the participant-related information from a preferences database 230. Preferences database 230 may be configured to store participant-related information for each participant in the conversation. In various embodiments, the participants may register their participant-related information with decision support system 112 prior to entering a conversation. For example, participants may be able to access decision support system 112 through another website or register their mobile device with the system. In various embodiments, decision module 260 may forward all inputs made by the participants in the conversation to preferences database 230 to store for later use in refining the relevancy determination. The participant-related information may be stored in preferences database 230 based on different attributes of the participant. In various embodiments, the participant-related information may be identified based on a telephone number associated with the user device 102. In other embodiments, the participant-related information may be identified based on a MAC address or other hardware identifier of the user device 102. Because multiple people may be able to use a user device 102, the participant-related information may be identified based on a username associated with the participant in various embodiments.

In various embodiments, analyzer module 240 may pull participant-related information from other applications operating on the participant's user device 102, or stored on the user device 102 itself. Information held by other social media and social entertainment applications on a user device 102 may provide insight into the relevancy of events and activities to the group. For example, analyzer module 240 may pull participant-related information from other applications, such as applications for Netflix®, Hulu®, Amazon®, iTunes®, and HBOGo®, among others. Analyzer module 240 may also pull information on a participant's preferences from social media applications, such as Facebook® and Instagram®. In various embodiments, the participant-related information may be stored locally on the user device 102. In this way, more specific information about the participant's preferences may be used in determining relevance. In various embodiments, analyzer module 240 may also pull information stored on the user device 102, such as scheduling data from a participant's calendar or planner application, and/or data about the participant's location via the user device's positioning capabilities. This user device side participant-related information may be used to further refine the relevancy determination based on the location of the users at the time of the conversation, or even the users' availability on a later date.

In various embodiments, analyzer module 240 may be configured to access user device side participant-related information whenever a relevancy determination is to be made. In other embodiments, decision support system 112 may be configured to request permission from the participant to allow analyzer module 240 to access user device side participant-related information. In various embodiments, such access may be requested every time a relevance determination is being made.

When determining the relevance of an event, analyzer module 240 may pull participant-related information from preferences database 230 or from the user device 102 and use that information to filter through and identify the most relevant events. For example, say one of the participants asks if anyone would want to see a specific movie. Analyzer module 240 could pull the participant-related information for each participant in the conversation. If any of the participants have previously indicated that they do not want to see a particular movie, than analyzer module 240 can inform retrieval module 250 that the specific movie is not relevant to the conversation and, accordingly, related information should not be retrieved. On the other hand, if a participant mentions a desire to see a movie without a specific title in mind, analyzer module could search through each participants' recent viewing history and each participants' stated preferences contained in either the preferences database 230 or pulled from another social application on user device 102 to determine the type of movie or movies that would appear relevant to the group. Positioning information pulled by from the user device's positioning capabilities may be used to further refine which movie or movies are relevant by showing only those movies that are showing within a certain radius of the members of the group. This additional determination further ensures that only relevant information is being presented to the group.

In various embodiments, analyzer module 240 may analyze a message of each participant after the message is entered into the messaging platform. In other embodiments, analyzer module 240 may be configured to monitor each participant as they enter a message. In this way, analyzer module can identify keywords prior to presentation of the message to the group, allowing for real-time inclusion of relevant event-related information into the conversation in accordance with the process described below. Analyzer module 240 can compare the messages of each participant against a keyword listing stored in event information server 210, described in more detail below, or a separate keyword database (not pictured).

Decision support system 112 further comprises a retrieval module 250. Once analyzer module 240 identifies one or more keywords associated with a specific event or a type of event, retrieval module 250 locates and retrieves event-related information for one or more relevant events, as determined by analyzer module 240. In various embodiments, retrieval module 250 may be configured to conduct the relevancy determination described above with respect to analyzer module 240. Once the information is retrieved, retrieval module 250 then returns the information to the messaging platform in presentation window 310, shown in FIG. 3. The event-related information 320 is displayed such that it is visible within the conversation.

In various embodiments, retrieval module 250 may present the event-related information 320 directly to the participants by inserting presentation window 310 directly into the conversation thread of the messaging platform. In other embodiments, retrieval module 250 may return the information to messaging platform host 110, allowing messaging platform host 110 to format and present the information to the participants. In various embodiments, if more than one event is deemed relevant and presented to the participants, the retrieval module could present all the event-related information 320 at once in presentation window 310. In some embodiments, presentation window 310 may be formatted such that presentation window 310 is easily displayed within the conversation, such as by restricting presentation window 310 to a maximum size and providing a means for each participant to review all the relevant event-related information included. For example, a scroll bar may be provided to allow each participant to scroll through all the event-related information presented within presentation window 310. In other embodiments, presentation window 310 may show only event-related information 320 for a single event on a page, and include several pages through which the participants may review. In some embodiments, each participant may be able to see the next event page by clicking an arrow presented within presentation window 310. In other embodiments, a "next" and "previous" button may be provided within presentation window 310 for each user to use in reviewing the event pages. In other embodiments, the events may be presented in a carousel-fashion, whereby each event would be shown for a certain amount of time before the next event would be shown. In some embodiments, a user may be able to speed up the carousel presentation, or stop the carousel if the user would like to review the event information in more detail.

In various embodiments, retrieval module 250 may present the participant who began the group-decision making process with an option whether to post the information to the group within the conversation thread. In these embodiments, the option to post acts as a secondary check of relevance. If the participant who first indicated a desire to make a group decision on a social activity finds that the events determined relevant by analyzer module 240 are not proper, the participant may indicate as such and save non-relevant information from cluttering the conversation.

Figure 3:
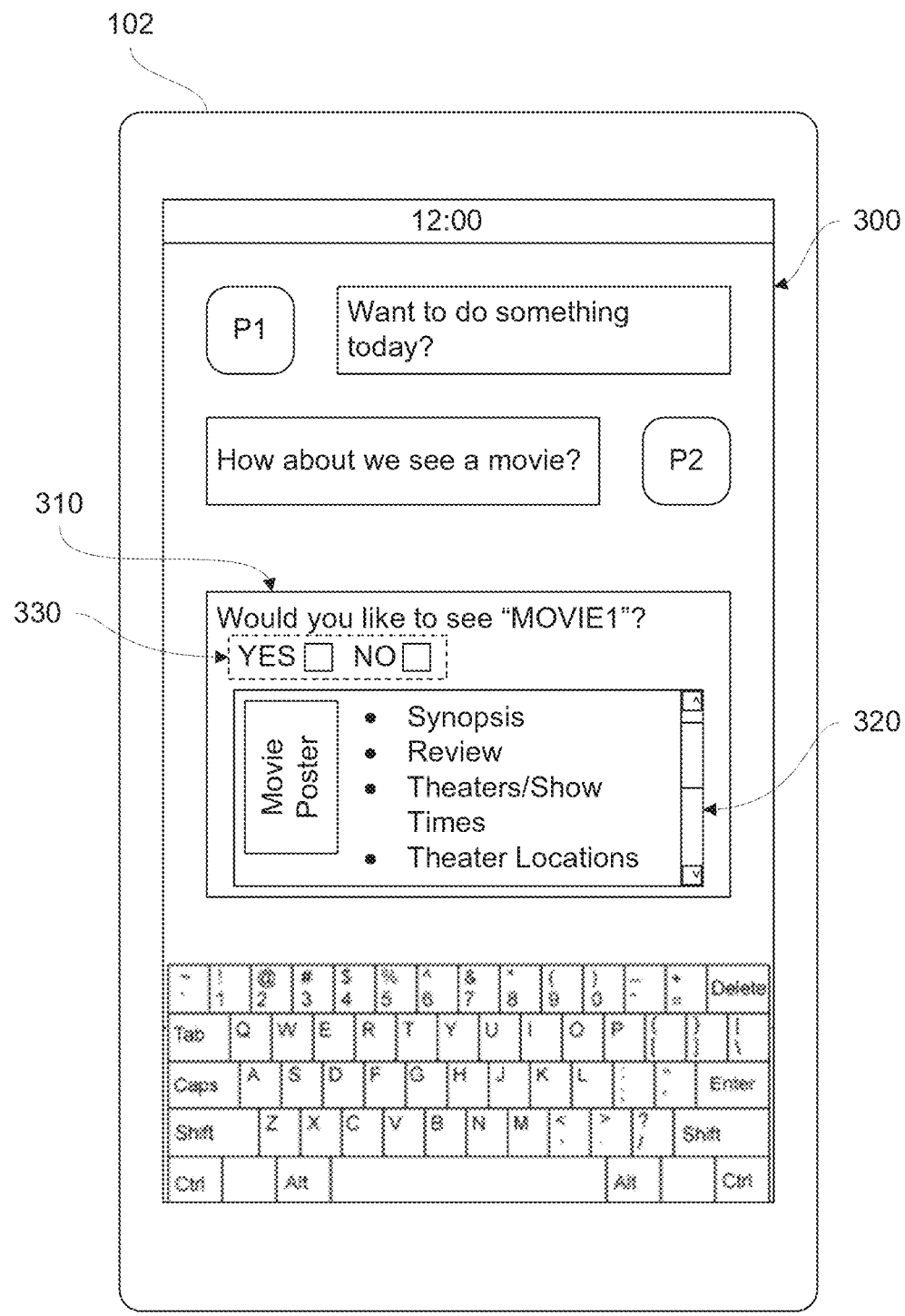
FIG. 3 illustrates an example messaging platform conversation thread with an example presentation of event information retrieved in accordance with the technology disclosed herein.

In various embodiments, retrieval module 250 may also present to the participants a voting option 330 in addition to the relevant information in the presentation window 310, as illustrated in FIG. 3.

As shown in FIG. 2, decision support system 112 may also include a decision module 260 configured to accept any inputs requested of the participants. Decision module 260 may be configured to aggregate the inputs related to voting option 330 to determine a number of conversation participants who want to attend an event or activity presented from the retrieval module 250, and compare that attending number against a threshold value. The threshold value may be a predetermined percentage of the participants who indicate a desire to attend the event or activity presented. In various embodiments, the threshold value could be a simple majority, or just more than 50%, or a higher or lower value. In various embodiments, the threshold value could change based on different tiers related to the number of participants in the group conversation. For example, if there are less than 4 people in conversation, the threshold value could be 50%, or two people. If there are between 4 and 8 participants, the value could range from as low as 25% to 100%, or a unanimous decision by the group.

Based on the results of the comparison of the attending number with the threshold value, additional information may need to be presented to the participants. In various embodiments, where the attending number meets or exceeds the threshold value, decision module 260 may decide that the participants should be given the option to purchase any required admission for the event or activity. Accordingly, decision module 260 may send a message to retrieve module 250 to present the participants with an option to purchase required admission in presentation window 310. In various embodiments, retrieval module 250 may present the participants with a custom transaction screen in presentation window 310. This enables each participant to enter any required purchasing information, such as quantity of admission tickets, credit card information, etc. The purchasing information entered by each participant may then be received by decision module 260. Decision module 260 may then communicate with any event-specific transaction systems over network 108 on behalf of the participants. Decision support system 112 may be configured to communicate with event transaction systems operated by third party service providers, such as TicketMaster, Fandango, proprietary systems operated by specific locations, or other service provider systems. This allows the participants to agree to and purchase everything required for the event within the messaging platform, eliminating the need to leave the conversation and use another system. Decision support system 112 takes care of all the back-end processing.

In other embodiments, instead of presenting a custom transaction screen, retrieval module 250 may present an embedded window within presentation window 310 of the transaction environment for another system responsible for all purchases for the related event. In this way, presentation window 310 acts as a portal to another system, allowing the participant to interact directly with the transaction environment without leaving the messaging platform. URL and resource locator information necessary to access external transactions systems may be stored within event information server 210 or other memory component of decision support system 112, described in greater detail below. Retrieval module 250 can locate and retrieve this transaction environment information as needed to enable transactions to occur in the messaging platform.

In various embodiments, retrieval module 250 may present the participants with different options related to purchasing. In some embodiments, the participants may be presented with an option to share the cost of attendance for the group between only a few participants. This allows participants to customize the transaction to accommodate the group's intentions. In various embodiments, the participants may be able to share the costs prior to purchasing the required admission. In other embodiments, the participants may be able to share the costs after the initial transaction is completed. In such embodiments, a separate transaction window may be presented to the participants by retrieval module 250.

Where the attending number does not meet the threshold, decision module 260 may send a message to analyzer module 240 (or retrieval module 250 in embodiments where it determines relevance) to determine a list of alternate events. The alternate events may represent another one or more events that are not as closely related to the identified keywords, but are close enough to be considered similar. Essentially, the same process as outlined above is conducted, resulting in the presentation of an additional set of choices to the participants in presentation window 310.

Although described as distinct modules, the description should not be read to limit the technology disclosed herein to a certain embodiment. In various embodiments, analyzer module 240, retrieval module 250, and decision module 260 may be implemented in a single module, or subdivided into multiple modules. For example, the analyzer and retrieval modules may be implemented in a single module, or the analyzer and decision modules may be implemented in a single module.

Although the example embodiment has been described being implemented with a text-based messaging platform, the description should not be read to limit the technology disclosed herein to text-based platforms. In various embodiments, the messaging platform may enable video conferencing. In such embodiments, a voice recognition module may be included in decision support system 112. In some embodiments, the voice recognition module may convert inputted audio into text for use by analyzer module 240 in accordance with the description of analyzer module 240 above. In other embodiments, analyzer module 240 may include the voice recognition module, instead of the voice recognition module being a separate component. In various embodiments, the messaging platform may employ one or more different types of communication, such as text-based messaging, video conferencing, or a combination thereof.

Although decision support system 112 has been described as a separate system from messaging platform host 110, the description should not be interpreted as limiting in any way. In various embodiments, one or all of the components of decision support system 112 may be implemented within messaging platform host 110. In various embodiments, messaging platform host 110 may have resident servers similar to event information server 210. In other embodiments, messaging platform host 110 may make calls to outside data servers to obtain additional information not stored locally at messaging platform host 110. Decision support system 112 may also make calls to outside data servers. In various embodiments, service providers can develop and operate a messaging platform employing decision support system 112. In various embodiments, a local client of decision support system 112 may operate on user devices 102, which may interact with multiple messaging platforms 110 operating on the user device.

Figure 4:
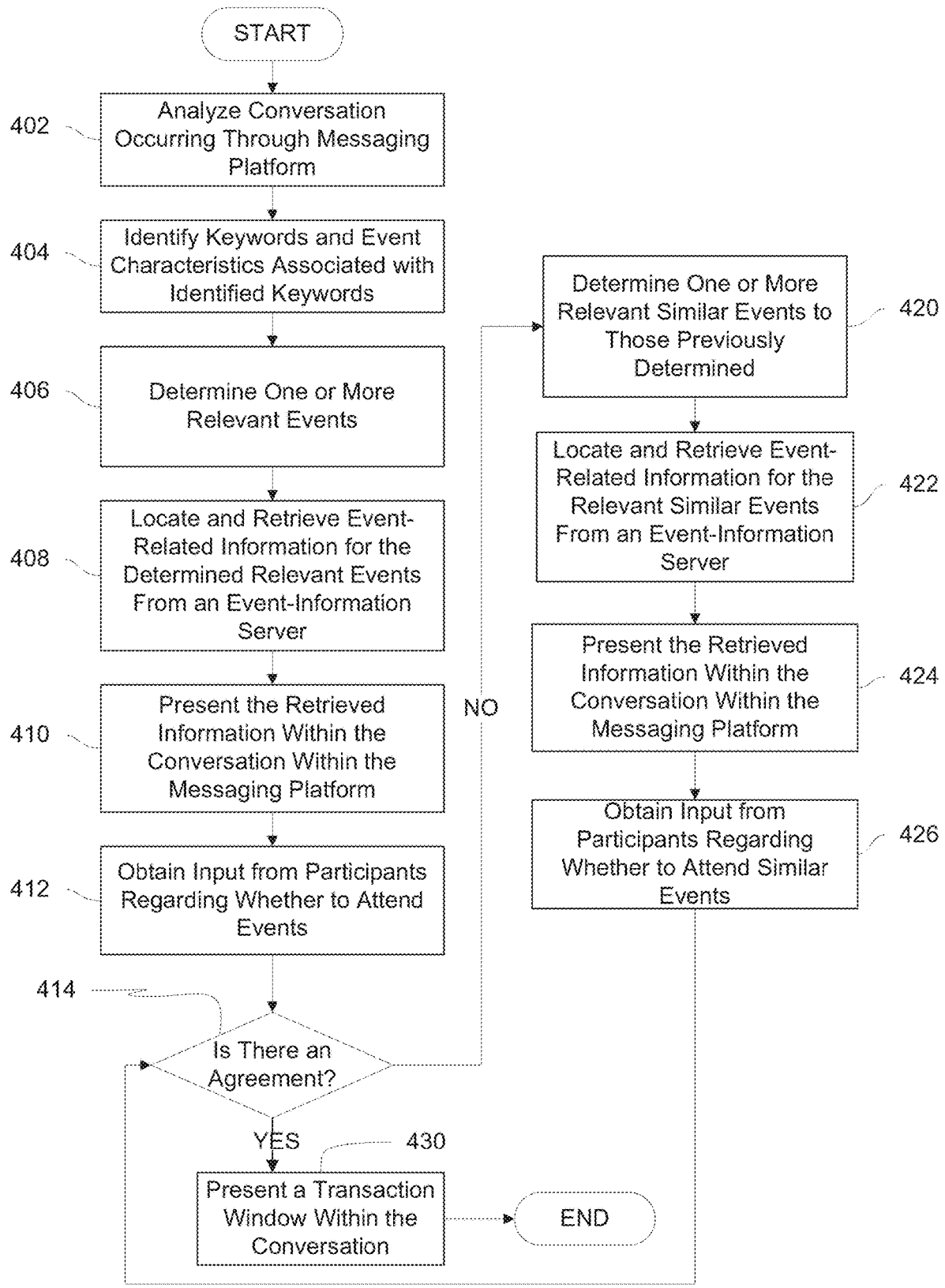
FIG. 4 is a flow chart of an example process in accordance with the technology disclosed herein.

FIG. 4 is a flow chart illustrating an example process for providing group decision-making support within a messaging platform in accordance with the present disclosure. Although described in relation to the descriptions of FIGS. 2 and 3, this description should not be read to limit the present disclosure to such embodiments. Other embodiments of the technology disclosed are contemplated by the present disclosure.

At operation 402, a conversation conducted using a messaging platform is monitored. This monitoring process may be carried out in the manner described above with respect to the analyzer module 240. In various embodiments, the conversation may be monitored after each participant submits a message. In other embodiments, the monitoring process may occur as the participants type, identifying keywords prior to the message being submitted to the conversation thread.

At operation 404, one or more keywords used by the participants are identified, and event characteristics associated with those keywords are also identified. The keywords may be words and phrases associated with particular events or types of events. Once the keywords are identified, particular event characteristics can be identified that are associated with those keywords. Event characteristics may comprise a type of activity, such as going to view a movie or attend a concert, or may comprise a specific name of an activity, such as the title of a play or proper name of a festival.

At operation 406, one or more relevant events are determined. The relevancy determination may be conducted in the same way as that described above in regards to the discussion of analyzer module 240 in FIG. 2.

At operation 408, the event-related information for the one or more determined events are located and retrieved from an event information server. The retrieval process may be the same as that described above with regard to the discussion of retrieval module 250 in FIG. 2. The event information server may be similar to the event information server 210 discussed above.

At operation 410, the retrieved information is returned to the messaging platform for presentation to the participants. The method of presentation may be the same as that discussed above with regard to retrieval module 250 from FIG. 2 and the example display of FIG. 3. In various embodiments, a voting option may also be presented to the participants to allow each person to indicate whether they would want to attend the presented event. The voting option may be a simple "YES" or "NO" option for each particular event. In various embodiments, the voting option may include additional options, such as an option to globally indicate a desire not to participate in any event, regardless of the event. In other embodiments, the voting option may include an option to indicate a desire for additional choices.

At operation 412, the participants input his or her response to the voting option, assuming the voting option was presented. An attending value for each presented event may be determined by aggregating the number of votes indicating a desire to attend the event.

At operation 414, a decision is made based on the results of the voting results from operation 412. The decision is made by comparing the attending values for each event determined at operation 412 against a threshold value. The threshold value may be determined in the same method as discussed above with regards to decision module 260.

If none of the attending values for the presented events meet the threshold value, the process moves onto operation 420. At operation 420, one or more events similar to those previously identified are determined. Operation 420 is conducted in a similar manner as that of operation 406.

Operations 422, 424, and 426 operate in the same manner as corresponding operations 408, 410, and 412, discussed above. The only difference between the operations 422, 424, 426, and operations 408, 410, 412, is that the similar events are different from the events presented in the original operations.

After operation 426, the process returns to operation 414, and another decision is made as to whether there has been an agreement. If there is still no agreement, the process returns to operation 420. In various embodiments, the process may continue until there are no longer any events that meet the criteria for relevancy. In other embodiments, the process may be capped at conducting operations 420-426 only a set number of times, for example only twice. After the limit is reached, the process ends.

If decision 414 returns that an agreement has been reached, a transaction window is presented to the participants within the messaging platform conversation. This operation may be similar to the transaction window discussed above with respect to FIGS. 2 and 3.

Figure 5:
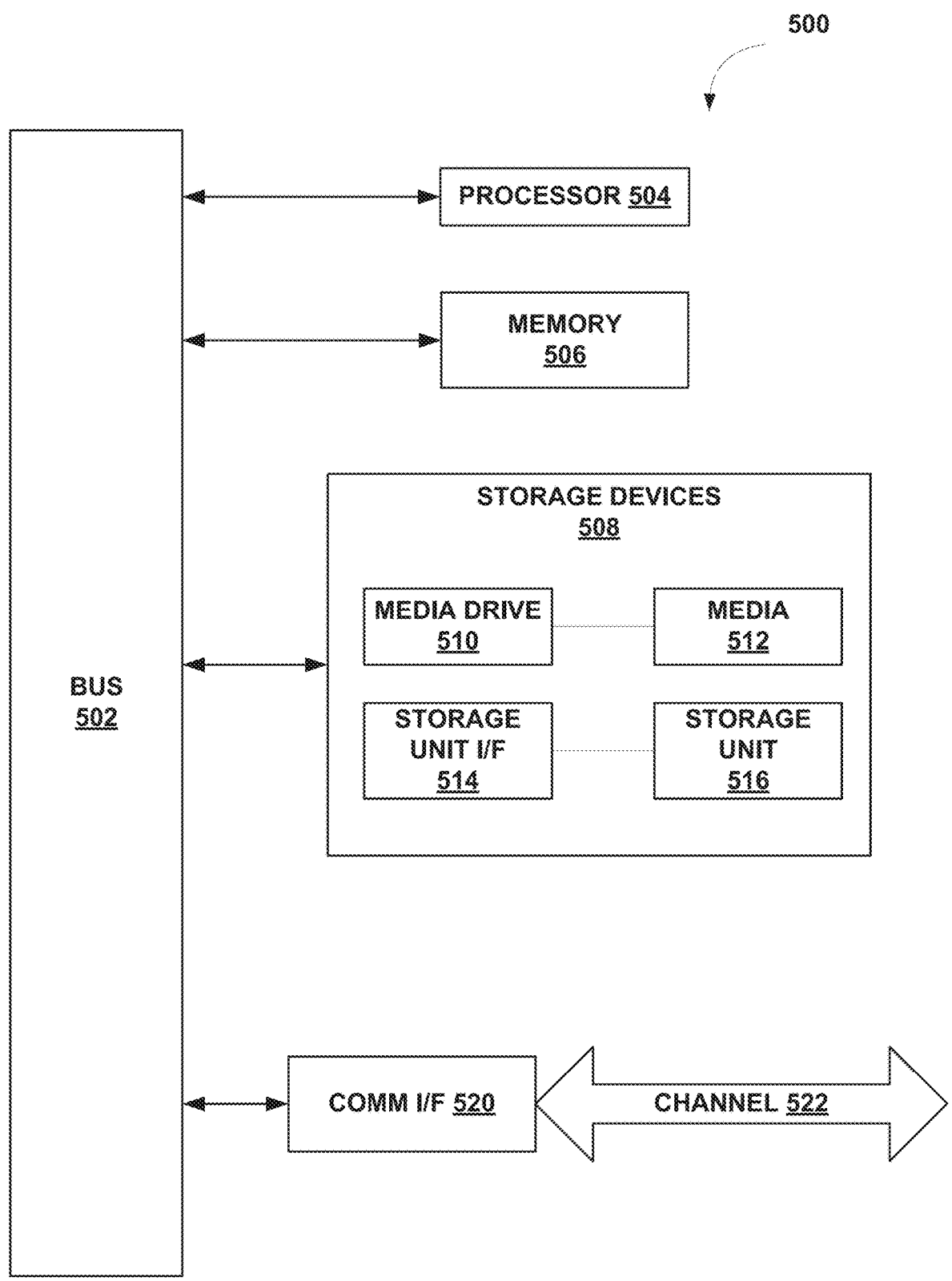
FIG. 5 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the technology using other computing modules or architectures.

Referring now to FIG. 5, computing module 500 may represent, for example, computing or processing capabilities found within desktop, laptop and notebook computers; hand-held computing devices (PDA's, smart phones, cell phones, tablets, palmtops, etc.) and wearables; mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 506. For example, preferably random access memory (RAM) or other dynamic memory, might be used for storing information and instructions to be executed by processor 504. Main memory 506 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 508, which might include, for example, a media drive 510 and a storage unit interface 514. The media drive 510 might include a drive or other mechanism to support fixed or removable storage media 512. For example, a hard disk drive, a floppy disk drive, a magnetic tape drive, an optical disk drive, a CD or DVD drive (R or RW), or other removable or fixed media drive might be provided. Accordingly, storage media 512 might include, for example, a hard disk, a floppy disk, magnetic tape, cartridge, optical disk, a CD or DVD, or other fixed or removable medium that is read by, written to or accessed by media drive 510. As these examples illustrate, the storage media 512 can include a computer usable storage medium having stored therein computer software or data.

In alternative embodiments, information storage mechanism 508 might include other similar instrumentalities for allowing computer programs or other instructions or data to be loaded into computing module 500. Such instrumentalities might include, for example, a fixed or removable storage unit 516 and an interface 514. Examples of such storage units 516 and interfaces 514 can include a program cartridge and cartridge interface, a removable memory (for example, a flash memory or other removable memory module) and memory slot, a PCMCIA slot and card, and other fixed or removable storage units 516 and interfaces 514 that allow software and data to be transferred from the storage unit 516 to computing module 500.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 522. This channel 522 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 506, storage unit 516, media 512, and channel 522. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   analyzing, in real-time, a conversation thread between two or more participants communicating using a messaging platform;
   identifying one or more keywords occurring in the conversation thread that are associated with an event characteristic, wherein the one or more keywords are identified by comparing messages of each participant of the conversation thread against a keyword listing stored in a database, wherein keyword identification is performed as messages are typed, and before being submitted to the conversation thread;
   using at least natural language processing to determine a contextual use of the one or more keywords;
   determining one or more events relevant to the event characteristic and the contextual use;
   using an application programming interface to locate and retrieve event-related information for the one or more events from an event information server; and
   displaying the retrieved event-related information to the two or more participants in the messaging platform, wherein displaying the retrieved event-related information comprises:
   inserting the retrieved event-related information into the conversation thread wherein the conversation thread is visible to the two or more participants in a presentation window; or
   displaying an option to one of the two or more participants, wherein the one of the two or more participants is the participant associated with the identified one or more keywords, and the option includes an option to present the retrieved event-related information to the two or more participants in a presentation window.

2. The computer-implemented method of claim 1, further comprising presenting at least one option to the two or more participants to attend at least one of the one or more events.

3. The computer-implemented method of claim 2, further comprising:
   determining an attending number for each of the one or more events, wherein the attending number comprises a value of participants who selected the at least one option;

comparing the attending number for each of the one or more events with an agreement threshold value; and if the attending number for each of the one or more events meets or exceeds the agreement threshold value, presenting a purchasing option for each event configured to allow each participant to purchase entry, if required.

4. The computer-implemented method of claim 3, wherein if the attending number does not meet or exceed the agreement threshold value, the computer-implemented method further comprises:

determining one or more alternate events, wherein the alternate events comprise events related to the event characteristic associated with the identified one or more keywords;

locating and retrieving relevant information for the one or more alternate events from the event information server; and presenting the retrieved relevant information for the one or more alternate events to the two or more participants.

5. The computer-implemented method of claim 1, wherein displaying the retrieved event-related information comprises inserting the retrieved event-related information into the conversation thread such that the retrieved event-related information is visible to the two or more participants.

6. The computer-implemented method of claim 1, wherein displaying the retrieved event-related information comprises displaying the option to the one of the two or more participants, wherein the one of the two or more participants is associated with the identified one or more keywords, and the option includes the option to present the retrieved event-related information to the two or more participants.

7. The computer-implemented method of claim 1, wherein determining the one or more events relevant to the event characteristic comprises comparing the one or more keywords with the event-related information for the one or more events stored in the event information server.

8. The computer-implemented method of claim 1, wherein the event characteristic comprises a type of event, and wherein the one or more events comprise events corresponding to the type of event.

9. The computer-implemented method of claim 1, wherein the event characteristic comprises an identification of a specific event, and wherein locating and retrieving the event-related information comprises locating and retrieving event-related information for the specific event.

10. The computer-implemented method of claim 1, wherein the messaging platform is configured to enable one or more of text-based messaging, video-conferencing, or a combination thereof.

11. The computer-implemented method of claim 1, wherein determining the one or more events comprises retrieving participant-related information for each of the one or more participants and filtering events associated with the event characteristic in accordance with the participant preference information.

12. The computer-implemented method of claim 11, wherein the participant preference information is retrieved from one or more of the following: a participant preference database configured to store participant preference information, other social entertainment applications operating on a participant's user device, or a combination thereof.

13. A non-transitory computer readable medium having executable instructions stored thereon, that when executed by a processor, performs operations of:

storing event-related information for a plurality of events in a memory;

monitoring, in real-time, a conversation between two or more participants through a messaging platform over a communication network;

identifying one or more keywords associated with at least one of the plurality of events;

determining one or more relevant events based on the identified keywords, wherein the one or more keywords are identified by comparing messages of each of the two or more participants of the conversation thread against a keyword listing stored in a database, wherein keyword identification is performed as messages are typed, and before being submitted to the conversation thread;

locating and retrieving event-related information for the one or more relevant events from the memory; and displaying the event-related information to the two or more participants, wherein displaying the retrieved event-related information comprises:

inserting the retrieved event-related information into the conversation thread wherein the conversation thread is visible to the two or more participants in a presentation window; or displaying an option to one of the two or more participants, wherein the one of the two or more participants is the participant associated with the identified one or more keywords, and the option includes an option to present the retrieved event-related information to the two or more participants in a presentation window.

14. The non-transitory computer readable medium of claim 13, wherein the instructions, when executed by the processor, further perform operations of: accepting an input from the two or more participants through the messaging platform, determining an attending number, comparing the attending number with a threshold number, and, if the threshold number is met by the attending number, presenting an option to purchase entry to the event, if required.

15. The non-transitory computer readable medium of claim 14, wherein the instructions, when executed by the processor, further perform an operation of:

if the threshold number is not met by the attending number, sending a request to identify one or more alternative events related to the one or more keywords.

16. The non-transitory computer readable medium of claim 13, wherein the instructions, when executed by the processor, further perform operations of: retrieving participant-related information unique to each of the two or more participants and using the retrieved participant-related information in determining relevant event-related information.

17. The non-transitory computer readable medium of claim 13, wherein the messaging platform is a voice conferencing platform, and wherein the instructions, when executed by the processor, further perform an operation of: translating a voice conversation between two or more participants through the voice conferencing platform into a useful format.

18. The non-transitory computer readable medium of claim 13, wherein the instructions, when executed by the processor, further perform operations of: accessing and retrieving one or more sources of participant-related information on one or more user devices, and using the retrieved participant-related information in determining relevant event-related information.

19. The non-transitory computer readable medium of claim 18, wherein the one or more sources of participant-related information comprises one or more social entertainment applications operating on the one or more user devices.

20. The non-transitory computer readable medium of claim 18, wherein the one or more sources of participant-related information comprises one or more memory components on the one or more user devices.

* * * * *